United States Patent
Croak et al.

(10) Patent No.: US 8,654,788 B2
(45) Date of Patent: *Feb. 18, 2014

(54) METHOD AND APPARATUS FOR DYNAMICALLY ADJUSTING BROADBAND ACCESS BANDWIDTH

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 263 days.

This patent is subject to a terminal disclaimer.

(21) Appl. No.: 12/938,353

(22) Filed: Nov. 2, 2010

(65) Prior Publication Data

US 2011/0164529 A1    Jul. 7, 2011

Related U.S. Application Data

(63) Continuation of application No. 11/322,578, filed on Dec. 31, 2005, now Pat. No. 7,843,964.

(51) Int. Cl.
*H04L 12/66* (2006.01)
*H04J 3/16* (2006.01)

(52) U.S. Cl.
USPC ............................................. 370/468; 370/352

(58) Field of Classification Search
USPC ......... 370/468, 395.21, 352, 395.4, 400, 329, 370/330, 337, 401, 389, 392; 725/91, 103, 725/95, 97, 114, 118, 129, 138, 144; 709/226, 220, 232
See application file for complete search history.

(56) References Cited

U.S. PATENT DOCUMENTS

| | | | |
|---|---|---|---|
| 6,097,722 A | | 8/2000 | Graham et al. |
| 6,434,164 B1 | | 8/2002 | Matsunaga et al. |
| 6,909,726 B1 | * | 6/2005 | Sheeran ........................ 370/468 |
| 7,002,971 B1 | * | 2/2006 | Enns et al. .................... 370/401 |
| 7,085,249 B2 | | 8/2006 | Lohtia et al. |
| 7,086,077 B2 | | 8/2006 | Giammaressi |
| 7,292,602 B1 | * | 11/2007 | Liu et al. ....................... 370/468 |
| 7,843,964 B1 | * | 11/2010 | Croak et al. ................... 370/468 |
| 2003/0032433 A1 | | 2/2003 | Daniel et al. |

* cited by examiner

*Primary Examiner* — Hanh N Nguyen

(57) ABSTRACT

A method and apparatus for providing a method to enable subscribers of broadband access services, such as Digital Subscriber Loop based or Cable based broadband access services, to dynamically reconfigure their access arrangements as a function of the bandwidth usage of subscribers are disclosed. The present invention provides a method for broadband service providers to dynamically adjust access bandwidth allocation for subscribers by monitoring access bandwidth usage by subscribers and dynamically adjust the needed access bandwidth for the subscribers accordingly.

18 Claims, 5 Drawing Sheets

METHOD AND APPARATUS FOR DYNAMICALLY ADJUSTING BROADBAND ACCESS BANDWIDTH

This application is a continuation of the U.S. patent application Ser. No. 11/322,578, filed on Dec. 31, 2005, now U.S. Pat. No. 7,843,964 which is currently allowed and is incorporated herein by reference in its entirety.

The present invention relates generally to communication networks and, more particularly, to a method and apparatus for dynamically adjusting broadband access bandwidth in communication networks, e.g. packet networks such as broadband access networks.

BACKGROUND OF THE INVENTION

Subscribers of broadband access services are increasingly subscribing to VoIP services. The bandwidth needed for transmitting voice packets is typically higher than needed for basic data transmissions. This is especially true if higher voice quality is required and the voice packets receive a minimal amount of compression to preserve the quality of the voice communication.

Therefore, a need exists for a method and apparatus for dynamically adjusting broadband access bandwidth in a packet network, e.g., a broadband access network.

SUMMARY OF THE INVENTION

In one embodiment, the present invention provides a method to enable subscribers of broadband access services, such as Digital Subscriber Loop based or Cable based broadband access services, to dynamically reconfigure their access arrangements as a function of the bandwidth usage of subscribers. Subscribers that subscribe to a basic amount of bandwidth can dynamically increase their bandwidth allocation when they invoke a voice or video application by simply requesting the application. The present invention provides a method for broadband service providers to dynamically adjust access bandwidth allocation for subscribers by monitoring access bandwidth usage by subscribers and dynamically adjust the needed access bandwidth for the subscribers accordingly.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
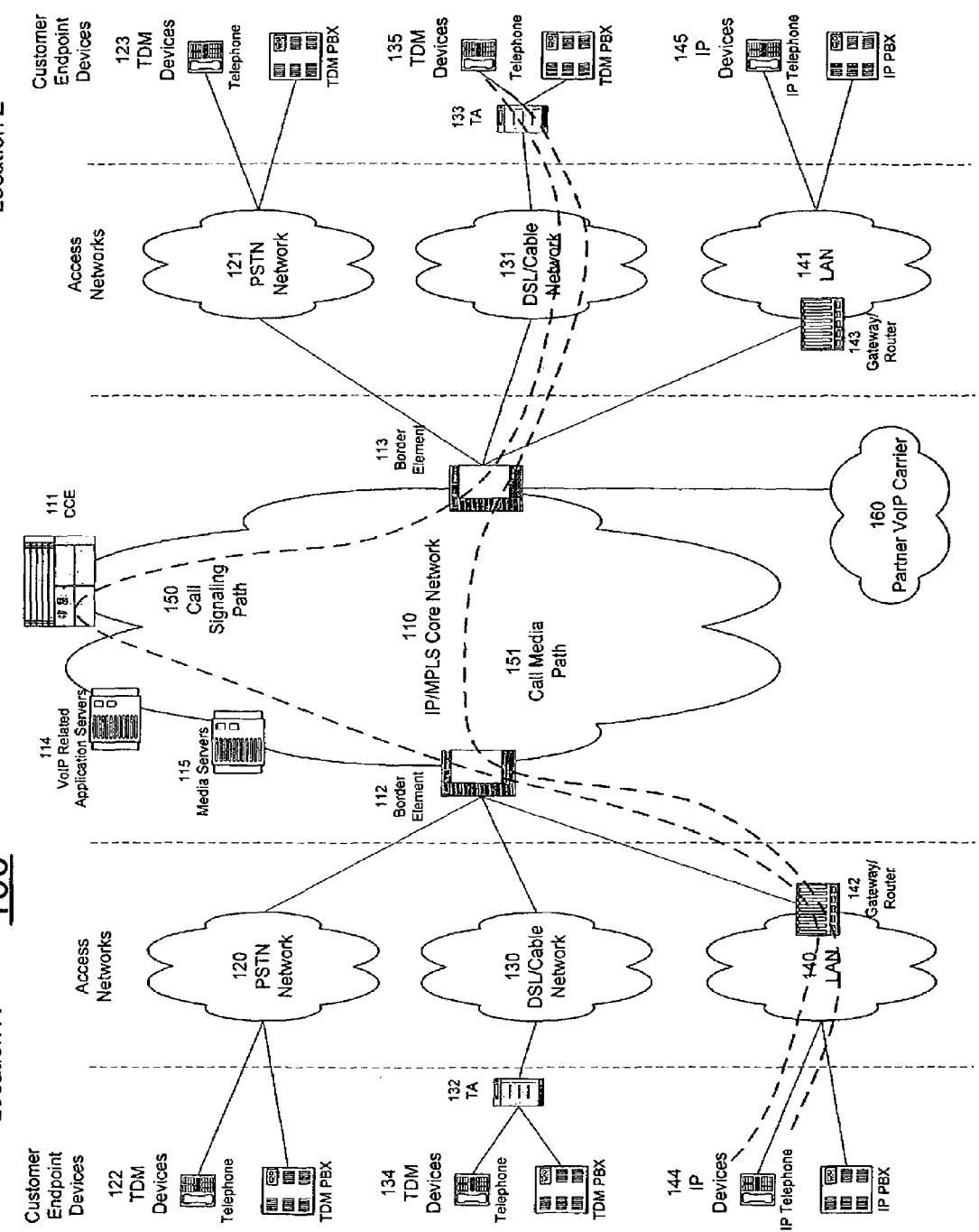
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner 1P Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers of broadband access services are increasingly subscribing to VoIP services. The bandwidth needed for transmitting voice packets is typically higher than needed for basic data transmissions. This is especially true if higher voice quality is required and the voice packets receive a minimal amount of compression to preserve the quality of the voice communication.

To address this need, the present invention provides a method to enable subscribers of broadband access services, such as Digital Subscriber Loop based or Cable based broadband access services, to dynamically reconfigure their access arrangements as a function of the bandwidth usage of subscribers. Subscribers that subscribe to a basic amount of bandwidth can dynamically increase their bandwidth allocation when they invoke a voice or video application by simply requesting the application. The present invention provides a method for broadband service providers to dynamically adjust access bandwidth allocation for subscribers by monitoring access bandwidth usage by subscribers and dynamically adjust the needed access bandwidth for the subscribers accordingly.

Figure 2:
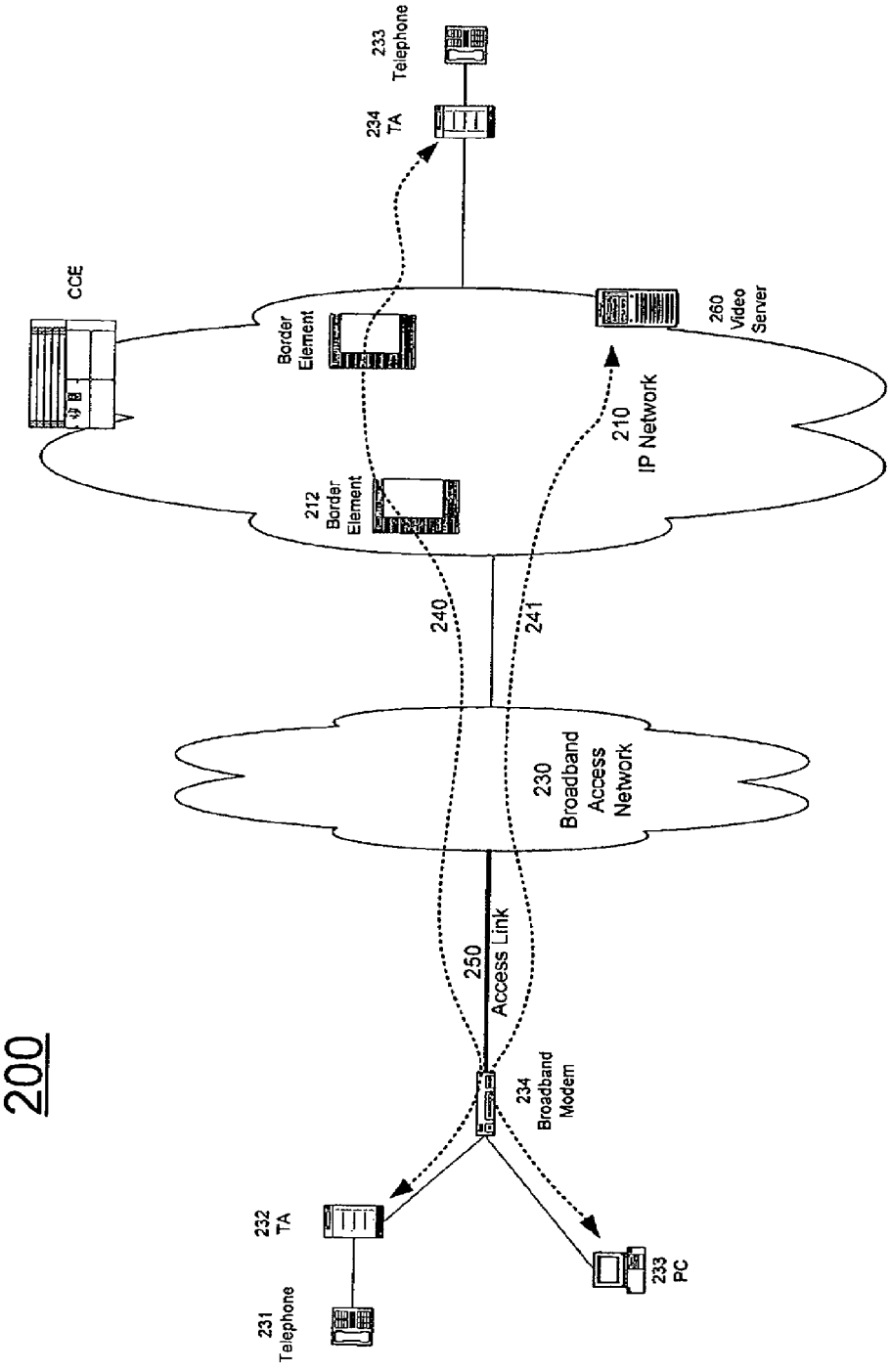
FIG. 2 illustrates an example of dynamically adjusting broadband access bandwidth in a broadband access network of the present invention.

FIG. 2 illustrates an example 200 of dynamically adjusting broadband access bandwidth in a broadband access network of the present invention. In FIG. 2, a subscriber uses telephone 231 and TA 232 via broadband modem 234 to access VoIP phone services and PC 233 via broadband modem 234 to access IP network services. Broadband modem 234 is connected to Broadband Access Network 230 using access link 250. The bandwidth available to the subscriber is controlled by the network provider of Broadband Access Network 230. The subscriber usually pay a flat monthly rate to have access to an agreed upon subscribed level of access bandwidth. Broadband Access Network 230 is connected to IP Network 210 through which the edge VoIP network element, BE 212, or Video Server 260 can be reached.

When the subscriber is have a phone conversation using telephone 231 to talk to another call party using telephone 233, call media data packets are exchanged between TA 232 and TA 234 using flow 240. The bandwidth usage of Access Link 250 is continuously monitored by Broadband Access Network 230. When Broadband Access Network 230 detects the bandwidth usage consistently exceeds the subscribed level of bandwidth over a predefined period of time, Broadband Access Network 230 dynamically increases the available bandwidth beyond the subscribed level in Access Link 250 to match the bandwidth needs of the subscriber. The predefined period of time is a configurable parameter set by the network provider of Broadband Access Network 230. When Broadband Access Network 230 detects the bandwidth usage returns to the subscribed level of bandwidth over another predefined period of time, Broadband Access Network 230 dynamically decreases the available bandwidth back to the subscribed level in Access Link 250 to match the bandwidth needs of the subscriber. This another predefined period of time is another configurable parameter set by the network provider of Broadband Access Network 230.

Similarly, when subscriber accesses Video Server 260 to watch a video session using PC 233, video data packets are sent from Video Server 260 to PC 233 using flow 241. The bandwidth usage of Access Link 250 is continuously monitored by Broadband Access Network 230. When Broadband Access Network 230 detects the bandwidth usage consistently exceeds the subscribed level of bandwidth over a predefined period of time, Broadband Access Network 230 dynamically increases the available bandwidth beyond the subscribed level in Access Link 250 to match the bandwidth needs of the subscriber. The predefined period of time is a configurable parameter set by the network provider of Broadband Access Network 230. When Broadband Access Network 230 detects the bandwidth usage returns to the subscribed level of bandwidth over another predefined period of time, Broadband Access Network 230 dynamically decreases the available bandwidth back to the subscribed level in Access Link 250 to match the bandwidth needs of the subscriber. This another predefined period of time is another configurable parameter set by the network provider of Broadband Access Network 230.

In one embodiment, the total bandwidth usage of Broadband Access Line 250 by the subscriber is monitored independently in the network to subscriber direction and the subscriber to network direction. The dynamic bandwidth adjustment is also performed independently in the network to subscriber direction and the subscriber to network direction.

Figure 3:
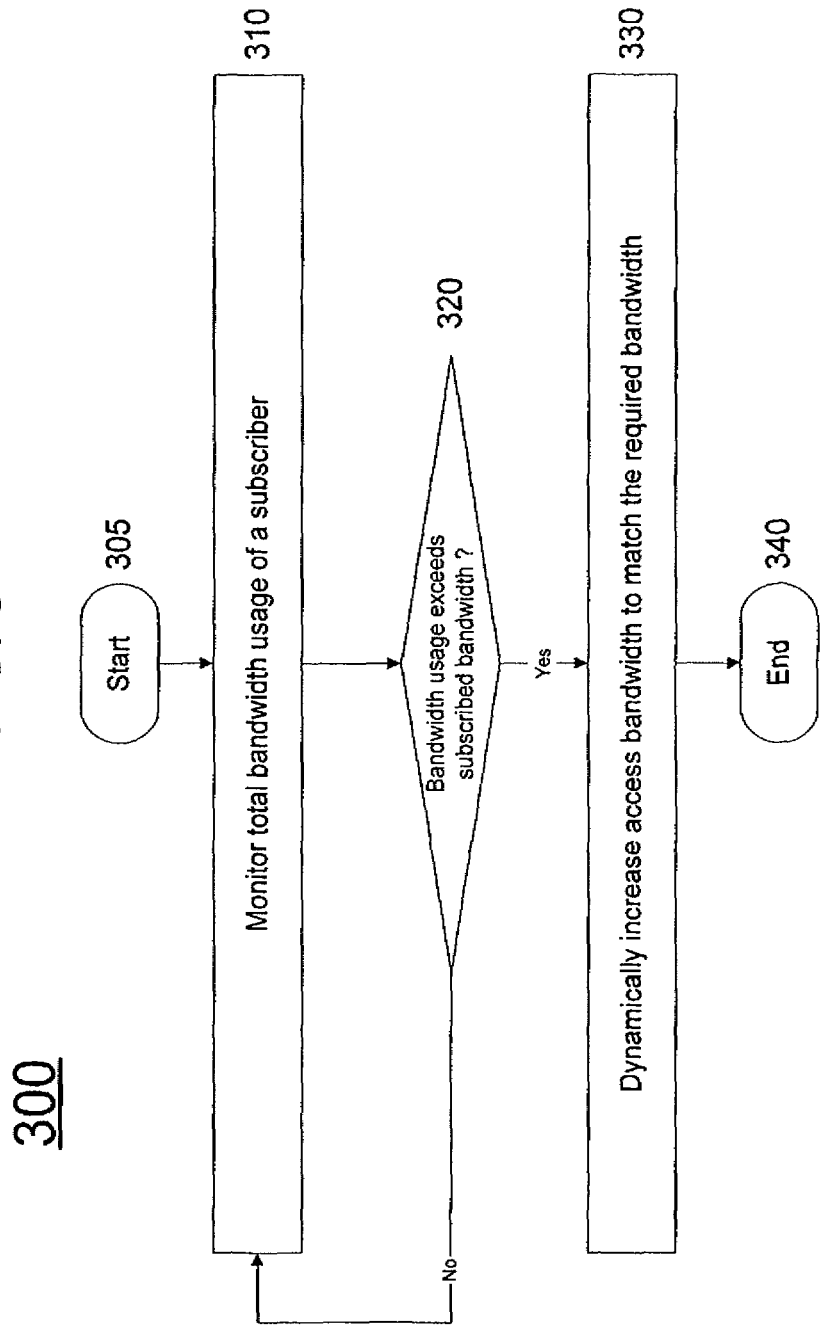
FIG. 3 illustrates a flowchart of a method for dynamically increasing broadband access bandwidth in a packet network, e.g., a broadband access network, of the present invention.

FIG. 3 illustrates a flowchart of a method 300 for dynamically increasing broadband access bandwidth in a packet network, e.g., a broadband access network, of the present invention. Method 300 starts in step 305 and proceeds to step 310.

In step 310, the method monitors the total access bandwidth usage by a subscriber. The total access bandwidth usage is monitored by a Broadband Access Network. The access bandwidth usage in the network to subscriber direction and the subscriber to network direction are monitored independently.

In step 320, the method checks if the subscribed level of access bandwidth is consistently exceeded by the subscriber over a predefined period of time. The predefined period of time is a configurable parameter set by the network provider of the Broadband Access Network. If the subscribed level of access bandwidth is consistently exceeded by the subscriber over the predefined period of time, the method proceeds to step 330; otherwise, the method proceeds back to step 310.

In step 330, the method dynamically increases the access bandwidth available to the subscriber to match the bandwidth needs of the subscriber. The available access bandwidth is dynamically increased by the Broadband Access Network. The access bandwidth increase in the network to subscriber direction and the subscriber to network direction are made independently. The method ends in step 340.

Figure 4:
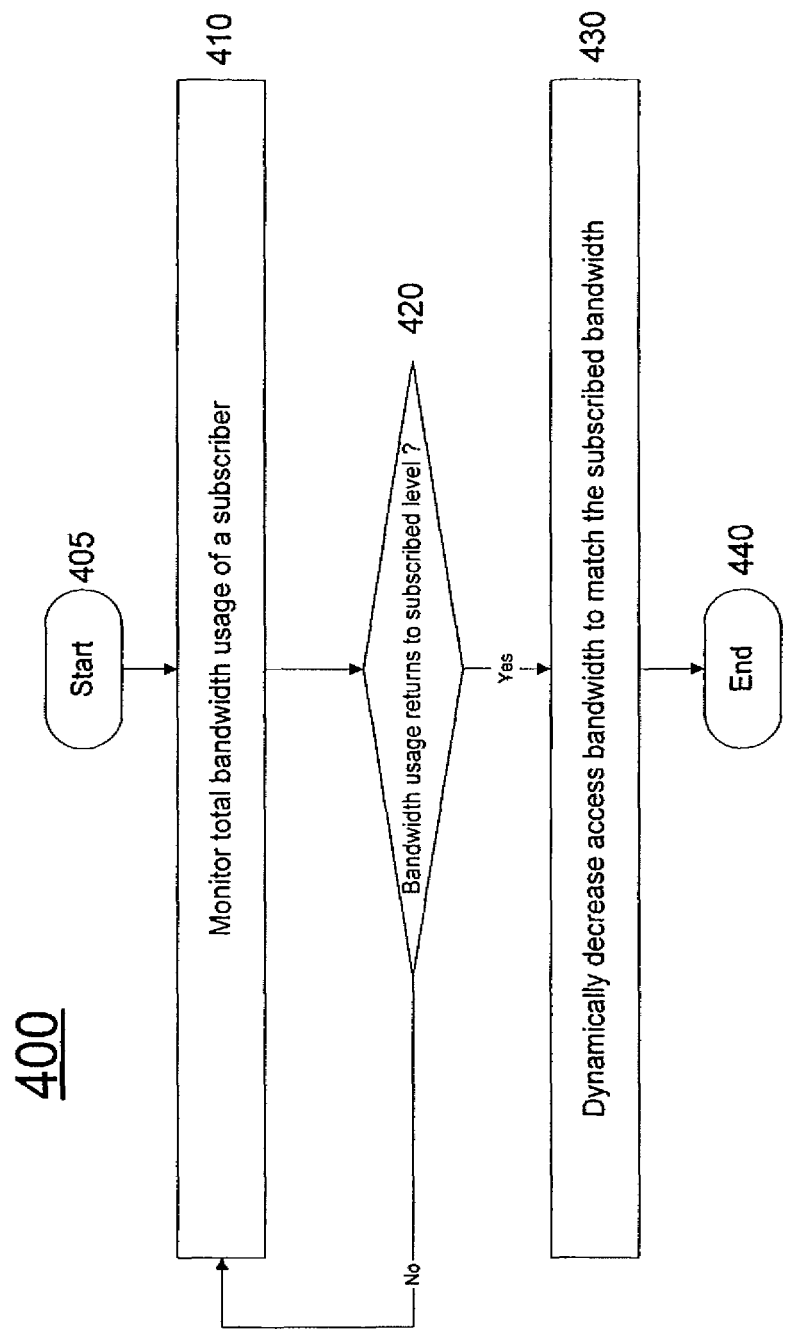
FIG. 4 illustrates a flowchart of a method for dynamically decreasing broadband access bandwidth in a packet network, e.g., a broadband access network, of the present invention.

FIG. 4 illustrates a flowchart of a method 400 for dynamically decreasing broadband access bandwidth in a packet network, e.g., a broadband access network, of the present invention. Method 400 starts in step 405 and proceeds to step 410.

In step 410, the method monitors the total access bandwidth usage by a subscriber. The total access bandwidth usage is monitored by a Broadband Access Network. The access bandwidth usage in the network to subscriber direction and the subscriber to network direction are monitored independently.

In step 420, the method checks if the total access bandwidth usage of the subscriber has returned to the subscribed level of bandwidth consistently over another predefined period of time. The said another predefined period of time is a configurable parameter set by the network provider of the Broadband Access Network. If the total access bandwidth usage of the subscriber has returned to, remained at or below, the subscribed level of access bandwidth consistently over another predefined period of time, the method proceeds to step 430; otherwise, the method proceeds back to step 410.

In step 430, the method dynamically decreases the access bandwidth available to the subscriber back to the subscribed level to match the bandwidth needs of the subscriber. The available access bandwidth is dynamically decreases by the Broadband Access Network. The access bandwidth decrease in the network to subscriber direction and the subscriber to network direction are made independently. The method ends in step 440.

Figure 5:
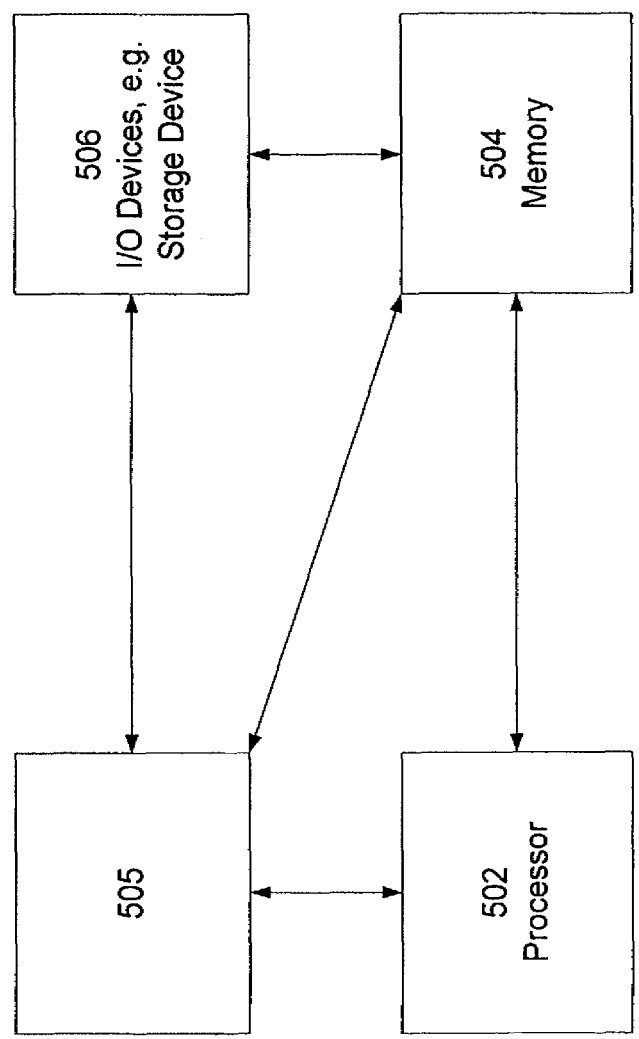
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for dynamically adjusting broadband access bandwidth, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for dynamically adjusting broadband access bandwidth can be loaded into memory 504 and executed by processor 502 to implement the functions as discussed above. As such, the present process 505 for dynamically adjusting broadband access bandwidth (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for increasing an available access bandwidth in a communication network, comprising:
   monitoring, by a processor of the communication network, a total access bandwidth usage of an access network link in the communication network for a subscriber, wherein the total access bandwidth usage of the access network link for the subscriber is monitored in a network to subscriber direction and a subscriber to network direction independently; and
   increasing, by the processor, the available access bandwidth to the subscriber to match the total access bandwidth usage of the subscriber when the total access bandwidth usage exceeds a subscribed level of bandwidth over a period of time and the total access bandwidth usage includes access bandwidth for a voice communication.

2. The method of claim 1, wherein the communication network is a broadband access network.

3. The method of claim 2, wherein the broadband access network is a digital subscriber loop network.

4. The method of claim 2, wherein the broadband access network is a cable network.

5. The method of claim 1, wherein the adjusting further comprises:
   decreasing the available access bandwidth back to the subscribed level to match the bandwidth usage of the subscriber when the total access bandwidth usage remains at or below the subscribed level of bandwidth over another period of time.

6. The method of claim 5, wherein the period of time and the another period of time are configurable parameters set by a network provider.

7. The method of claim 1, wherein the available access bandwidth is monitored and adjusted in a network to subscriber direction and a subscriber to network direction independently.

8. A tangible computer-readable medium storing instructions which, when executed by a processor of a communication network, cause the processor to perform operations for increasing an available access bandwidth in the communication network, the operations comprising:
   monitoring a total access bandwidth usage of an access network link in the communication network for a subscriber, wherein the total access bandwidth usage of the access network link for the subscriber is monitored in a network to subscriber direction and a subscriber to network direction independently; and
   increasing the available access bandwidth to the subscriber to match the total access bandwidth usage of the subscriber when the total access bandwidth usage exceeds a subscribed level of bandwidth over a period of time and the total access bandwidth usage includes access bandwidth for a voice communication.

9. The tangible computer-readable medium of claim 8, wherein the communication network is a broadband access network.

10. The tangible computer-readable medium of claim 9, wherein the broadband access network is a digital subscriber loop network.

11. The tangible computer-readable medium of claim 9, wherein the broadband access network is a cable network.

12. The tangible computer-readable medium of claim 8, wherein the adjusting further comprises:
   decreasing the available access bandwidth associated with the subscriber back to the subscribed level to match the bandwidth usage of the subscriber when the total access bandwidth usage remains at or below the subscribed level of bandwidth over another period of time.

13. The tangible computer-readable medium of claim 12, wherein the period of time and the another period of time are configurable parameters set by a network provider.

14. The tangible computer-readable medium of claim 8, wherein the available access bandwidth is monitored and adjusted in a network to subscriber direction and a subscriber to network direction independently.

15. An apparatus for increasing an available access bandwidth in a communication network, comprising:
   a processor of the communication network; and
   a computer-readable medium storing instructions which, when executed by the processor, cause the processor to perform operations, the operations comprising:
      monitoring a total access bandwidth usage of an access network link in the communication network for a subscriber, wherein the total access bandwidth usage of the access network link for the subscriber is monitored in a network to subscriber direction and a subscriber to network direction independently; and
      increasing the available access bandwidth to the subscriber to match the total access bandwidth usage of the subscriber when the total access bandwidth usage exceeds a subscribed level of bandwidth over a period of time and the total access bandwidth usage includes access bandwidth for a voice communication.

16. The apparatus of claim 15, wherein the communication network is a broadband access network.

17. The apparatus of claim 15, wherein the adjusting further comprises:
   decreasing the available access bandwidth associated with the subscriber back to the subscribed level to match the bandwidth usage of the subscriber when the total access bandwidth usage remains at or below the subscribed level of bandwidth over another period of time.

18. The apparatus of claim 15, wherein the available access bandwidth is monitored and adjusted in a network to subscriber direction and a subscriber to network direction independently.

* * * * *